(12) United States Patent
Lemmen et al.

(10) Patent No.: US 11,528,853 B2
(45) Date of Patent: Dec. 20, 2022

(54) DEVICE FOR DELIVERING AT LEAST A LAYER OF COMPOST AND CASING OIL TO A SHELVING FOR GROWING MUSHROOMS

(71) Applicants: Jacobus Alexander Jozef Lemmen, Venlo (NL); Marcus Gerardus Maria Van Doremaele, Velddriel (NL)

(72) Inventors: Jacobus Alexander Jozef Lemmen, Venlo (NL); Marcus Gerardus Maria Van Doremaele, Velddriel (NL)

(*) Notice: Subject to any disclaimer, the term of this patent is extended or adjusted under 35 U.S.C. 154(b) by 250 days.

(21) Appl. No.: 16/440,394

(22) Filed: Jun. 13, 2019

(65) Prior Publication Data

US 2019/0380286 A1    Dec. 19, 2019

(30) Foreign Application Priority Data

Jun. 14, 2018 (NL) .................................. 2021123

(51) Int. Cl.
*A01G 18/22* (2018.01)
*A01G 18/62* (2018.01)

(52) U.S. Cl.
CPC ............ *A01G 18/22* (2018.02); *A01G 18/62* (2018.02)

(58) Field of Classification Search
CPC ........ A01G 18/00; A01G 18/22; A01G 18/62; B65G 3/00
USPC .................... 47/1.1; 414/272, 300
See application file for complete search history.

(56) References Cited

U.S. PATENT DOCUMENTS

| | | | |
|---|---|---|---|
| 3,936,975 A * | 2/1976 | de Winter | A01G 18/60 47/1.1 |
| 4,170,432 A | 10/1979 | Pia | |
| 4,273,495 A * | 6/1981 | Pannell | A01G 18/20 414/272 |
| 4,371,305 A * | 2/1983 | Pannell | A01G 18/60 414/300 |
| 4,717,307 A | 1/1988 | Ciuffetelli | |
| 4,717,497 A | 1/1988 | Ciuffetelli | |
| 4,978,501 A * | 12/1990 | Diprose | A61L 2/12 422/22 |
| 6,817,286 B2 * | 11/2004 | Toto | A01G 18/20 100/152 |

FOREIGN PATENT DOCUMENTS

| | | |
|---|---|---|
| CN | 106879362 A | 6/2017 |
| IE | S20050384 A2 | 5/2006 |
| KR | 2018-0004440 A | 1/2018 |

OTHER PUBLICATIONS

Search report for Netherlands Patent No. 2021123.

* cited by examiner

*Primary Examiner* — David J Parsley
(74) *Attorney, Agent, or Firm* — Katten Muchin Rosenman LLP

(57) ABSTRACT

Device for delivering at least a layer of compost and casing soil to a shelving for growing mushrooms, comprising a first conveyor, on which in a downstream direction are arranged a first hopper with a receiving opening for receiving compost and a dispensing opening for delivering a compost layer on the first conveyor and a second hopper with a receiving opening for receiving casing soil and a dispensing opening for delivering casing soil on the compost layer wherein at least one separator for separating in a direction perpendicular to the downstream direction at least two fractions of the layer of compost with casing soil.

9 Claims, 1 Drawing Sheet

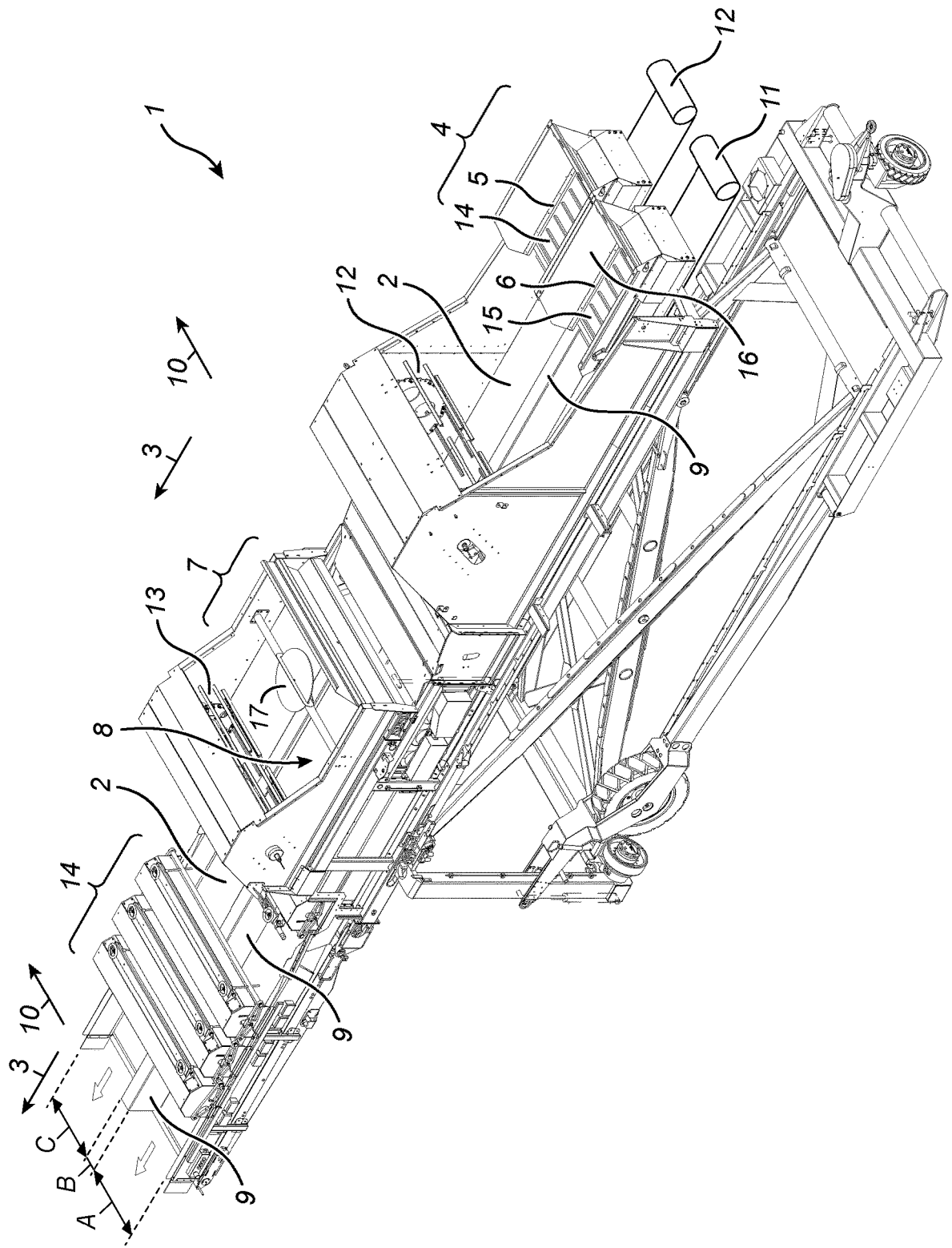

DEVICE FOR DELIVERING AT LEAST A LAYER OF COMPOST AND CASING OIL TO A SHELVING FOR GROWING MUSHROOMS

BACKGROUND OF THE INVENTION

The present invention relates to a device for delivering at least a layer of compost and casing soil to a shelving for growing mushrooms.

SUMMARY OF THE INVENTION

At industrial scales, mushrooms are traditionally grown at indoor locations, often called growing rooms, wherein shelvings are placed that support beds for holding compost and casing soil, on which the mushrooms are grown.

The compost and casing soil are placed on pulling nets, that allow to fill and empty the layer with compost and casing soil easily. Usually, this is done after every two or three flushes of mushrooms, since the compost has lost its fertility and nutrition then. The beds are placed at a mutual distance above each other in the shelving, and multiple shelves may be placed next to each other in a cell.

Delivering the compost and casing soil to the shelving is done with the aid of filling machines, that deliver a layer of compost topped with casing soil to one end of the shelving. The shelving is provided with a pulling net for that purpose, which pulling net is pulled over the shelving by means of a winch, at the same speed at which compost and casing soil are delivered to the shelving by the filling machine.

Since the shelving usually comprises multiple beds for growing mushrooms on top of each other, the filling machines are adapted to deliver the compost and soil at various heights. Various beds are filled sequentially. Since a cell may comprise multiple shelvings, the machine should be displaced in between shelvings, to fill them all.

However, the Dutch patent application NL 2021053 by the same applicant describes a novel type of shelving, comprising multiple pairs of beds at the same height level in the shelving. This shelving provides advantages for the harvesting of the mushrooms, but there is a need for further increase of efficiency in the entire mushroom growing process. It is therefore a goal of the present invention to provide yet a further improvement to mushroom growing in general, and to the use of the shelving described in the Dutch patent application NL 2021053 in particular.

The invention thereto proposes a device for delivering at least a layer of compost and/or casing soil to a shelving for growing mushrooms, comprising a first conveyor, on which in a downstream direction are arranged a first hopper with a receiving opening for receiving compost and a dispensing opening for delivering a compost layer on the first conveyor and a second hopper with a receiving opening for receiving casing soil and a dispensing opening for delivering casing soil on the compost layer and at least one separator for separating at least two fractions of the layer of compost with casing soil in a direction perpendicular to the downstream direction.

It is to be noted that embodiments are thinkable wherein the second hopper lacks. Such embodiments are suitable for delivering either compost or casing soil at the time.

The device according to the invention is a filling apparatus that is able to deliver two separate streams of compost with casing soil. The streams are delivered in parallel, and can be applied to a shelving simultaneously. A stream is a layer of compost and casing soil. Such shelving may in particular a shelving according to the Dutch patent application NL 2021053. The separator may be chosen such that the pair of streams of compost and casing soil are separated such distance that they can be delivered to two beds at the same height in the shelving simultaneously. In order to facilitate such method, a double winch for moving two pulling nets may be provided too.

According to the art, delivering the layer of compost and casing soil to the conveyor may be done by moving the filling machine as close to the shelving as possible, and to start the conveyor. In practice, the compost and casing soil is able to bridge small distances of several millimeters to a few centimeters without support, so the downstream end of the first conveyor according to the invention may be positioned at the level of the bed of the shelving an does not need to be on top of that.

Optionally, the device according to the invention may be provided with two suppliers for a foil, arranged upstream of the first hopper, so that each stream of compost and casing soil is arranged on a foil. Both foils may in that case be transferred to separate beds in the shelving with the compost and casing soil on top of it.

In a preferred embodiment, the separator comprises a blocking, adjacent to the surface of the conveyor, that locally prohibits the presence of a compost layer and casing soil.

Such blocking can basically be applied in two ways. The device can be arranged to create a layer of compost and casing soil on the first conveyor, and have the separator downstream from the second hopper. The separator then separates the already formed layer of compost and casing soil. The separator may have the form of a knife or wedge in that case, or have an almond shape. Such embodiment may be chosen for the ease of construction and for cost benefits that may be obtained from the simple construction of the separator.

However, as an alternative, the separator extends at least in the transport direction along the dispensing opening of the first hopper and the second hopper. This configuration has the benefit that there is no initial common layer of compost and casing soil that needs to be separated afterwards, but the separator directly causes two separated layers of compost and casing soil to arise. A benefit of this embodiment is that co compost or casing soil arrives at locations where it is later on to be removed from, which leads to less pollution of the overall machine and a more homogeneous and consistent layers of compost and casing soil.

In a preferred embodiment, the separator comprises a beam-shaped body, that extends essentially over the entire length of the conveyor. Herewith, a middle path of the first conveyor is in fact blocked for compost and casing soil. A beam shaped body may of course be formed by a beam, in particular one with a rectangular cross section, but a U-shaped profile with the opening of the U facing the first conveyor may also be applied.

Preferably, the device according to the invention further comprises at least one first equalizer, arranged between the dispensing opening of the first hopper and the dispensing opening of the second hopper for equalizing the compost layer, and preferably also at least one second equalizer, arranged downstream of the dispensing opening of the second hopper for equalizing the casing soil. These equalizers may for instance each comprise a pressure roller, but various solutions may be available according to the art.

In case of a separator that extends at least in the transport direction along the dispensing opening of the first hopper and the second hopper or a beam shaped separator that extends essentially along the entire first conveyor, the equalizers may be placed right above the separator, or in other words, the separator extends underneath the equalizers, with a height adapted to just not touch them.

The first hopper may in an embodiment comprise a second and a third conveyor, arranged above and in parallel to the first conveyor, and dimensioned such that they deliver compost provided to the first hopper at mutual sides of the separator on the first conveyor. A separation may be present between the second and the third conveyor. The second hopper may for instance comprise a gun conveyor, for dividing the casing sol in a direction perpendicular to the direction of conveyance.

BRIEF DESCRIPTION OF THE DRAWINGS

The invention will now be elucidated into more detail with reference to FIG. 1, which shows a perspective view of a device according to the present invention.

FIG. 1 shows a device 1 for delivering at least a layer of compost and casing soil to a shelving for growing mushrooms, comprising a first conveyor 2, on which in a downstream direction 3 are arranged a first hopper 4 with a receiving opening 5, 6 for receiving compost and a dispensing opening (not visible) for delivering a compost layer on the first conveyor 2 and a second hopper 7 with a receiving opening 8 for receiving casing soil and a dispensing opening (not visible) for delivering casing soil on the compost layer and at least one separator 9 for separating at least two fractions of the layer of compost with casing soil in a direction 10 perpendicular to the downstream direction 3.

The separator 9 may be chosen such that the pair of streams of compost and casing soil are separated such distance B that they can be delivered to two beds at the same height in the shelving simultaneously. The streams have widths A and C. In a practical embodiment A and C may for instance be 80 cm each, and B may be 15 cm. Alternatively, further conveyors may be present for simultaneously delivering compost and casing soil to beds at different heights, if desired.

Above the first and or the second hopper a divider may be present, to deliver the compost and/or casing soil evenly over the second and the third conveyor.

The device is provided with two optional suppliers for a foil 11, 12, arranged upstream of the first hopper 4, so that each layer of compost and casing soil is arranged on a foil. Both foils may in that case be transferred to separate beds in the shelving with the compost and casing soil on top of it.

The separator 9 extends in the transport direction along the dispensing opening of the first hopper and the second hopper. It comprises a beam-shaped body, that extends essentially over the entire length of the conveyor 2. Herewith, a middle path of the first conveyor 2 is in fact blocked for compost and casing soil.

The device 1 further comprises a first equalizer 12, arranged between the dispensing opening of the first hopper 4 and the dispensing opening of the second hopper 7 for equalizing the compost layer, and also a second equalizer 13, arranged downstream of the dispensing opening of the second hopper 7 for equalizing the casing soil. These equalizers 12, 13 each comprise a pressure roller, but various solutions may be available according to the art. Further equalizers 14 may be present further downstream.

The equalizers 12, 13 are placed right above the separator 9, or in other words, the separator 9 extends underneath the equalizers 12, 13, with a height adapted to just not touch them.

The first hopper 4 comprises a second and a third conveyor 14, 15, arranged above and in parallel to the first conveyor 2, and dimensioned such that they deliver compost provided to the first hopper 4 at mutual sides of the separator 9 on the first conveyor 2. A separation 16 is present between the second and the third conveyor 14, 15. The second hopper 7 may for instance comprise a gun conveyor 17, for dividing the casing sol in a direction perpendicular to the direction of conveyance.

The above example is exemplary only and in no way limiting the scope of protection as defined in the following claims.

The invention claimed is:

1. A device for delivering at least a layer of compost and casing soil to a shelving for growing mushrooms, comprising:
   a first conveyor:
   a first hopper, arranged on the first conveyor, with a receiving opening for receiving compost and a dispensing opening for delivering a compost layer on the first conveyor;
   a second hopper, arranged on the first conveyor downstream with respect to the first hopper, with a receiving opening for receiving casing soil and a dispensing opening for delivering the casing soil on a top of the compost layer;
   at least one separator arranged on the first conveyor and configured to separate the compost layer with the casing soil on the top of the compost layer in a direction perpendicular to the downstream direction into at least two separate parallel fractions, both of which are on the first conveyor, of the compost layer with the casing soil on the top of the compost layer; and
   a delivery end configured to deliver separately but simultaneously the at least two separate parallel fractions of the compost layer with the casing soil on the top of the compost layer to the shelving while maintaining a separation of the at least two separate parallel fractions of the compost layer on the shelving.

2. The device according to claim 1, wherein the separator comprises a blocking, adjacent to the surface of the first conveyor, that locally prohibits the presence of a compost layer and casing soil.

3. The device according to claim 1, wherein the separator extends at least in a transport direction of the first conveyor along the dispensing opening of the first hopper and the second hopper.

4. The device according to claim 3, wherein the separator comprises a beam-shaped body, that extends essentially over the entire length of the first conveyor.

5. The device according to claim 3, comprising:
   a first equalizer, arranged on the compost layer between the dispensing opening of the first hopper and the dispensing opening of the second hopper for equalizing the compost layer; and/or
   a second equalizer, arranged on the casing soil downstream of the dispensing opening of the second hopper for equalizing the casing soil.

6. The device according to claim 5, wherein at least one of the first and second equalizers comprises a pressure roller.

7. The device according to claim 5, wherein the first hopper comprises a second and a third conveyor, arranged above and in parallel to the first conveyor, and dimensioned such that the second and third conveyors deliver compost provided to the first hopper at mutual sides of the separator on the first conveyor.

8. The device according to claim 5, wherein the second hopper comprises a gun conveyor, for dividing the casing sol in a direction perpendicular to the transport direction of the first conveyor.

9. The device according to claim 5, comprising a supplier for two foils or comprising two suppliers for a foil, so that each layer of compost and casing soil is arranged on a foil.

* * * * *